April 5, 1932.  H. HUEBER  1,852,779
WINDSHIELD CLEANER AND WIPER CARRYING ARM THEREFOR
Filed Feb. 7, 1929
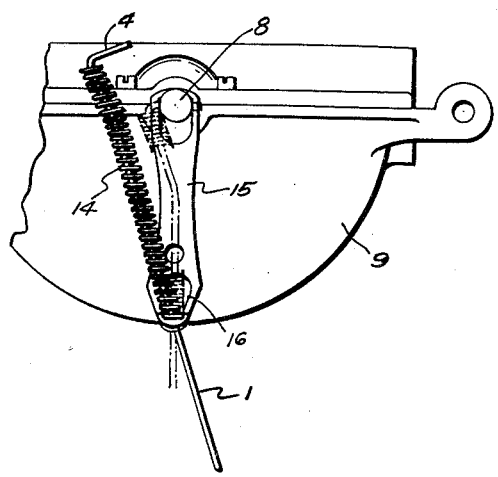
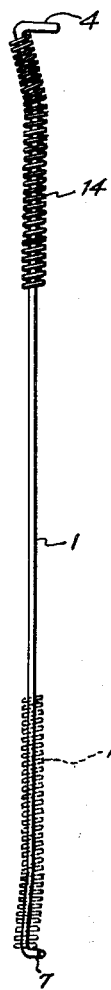
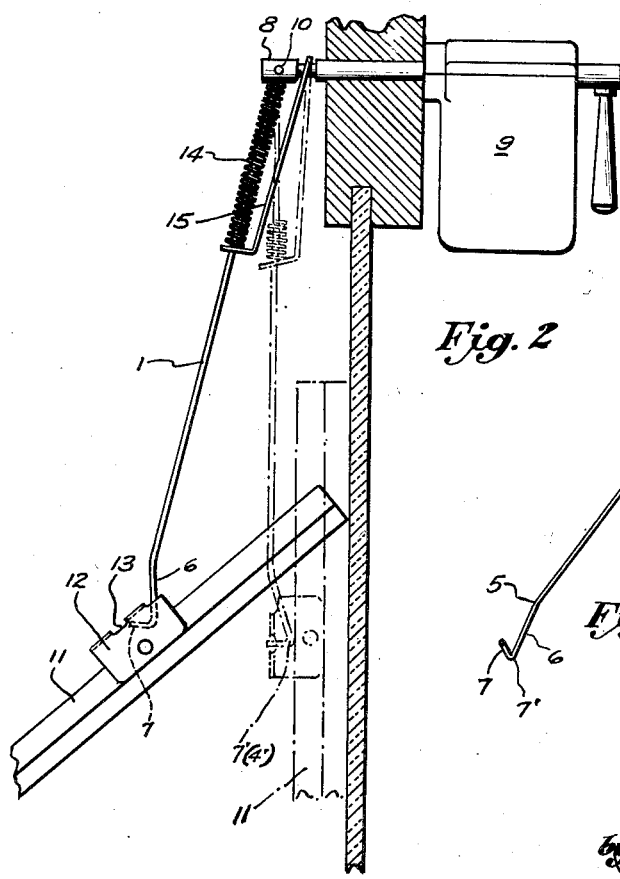
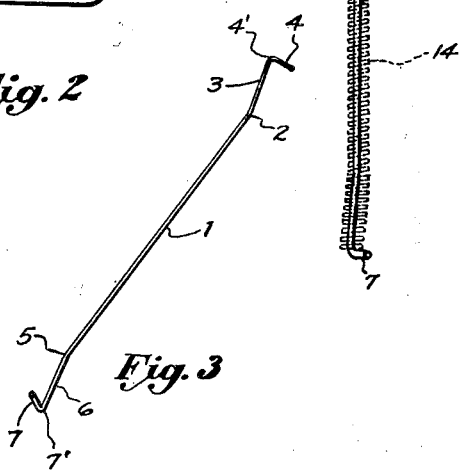
Inventor
Henry Hueber
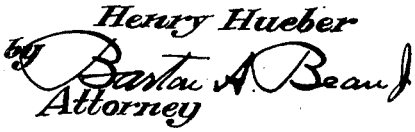
Attorney Patented Apr. 5, 1932

1,852,779

UNITED STATES PATENT OFFICE

HENRY HUEBER, OF BUFFALO, NEW YORK, ASSIGNOR TO TRICO PRODUCTS CORPORATION, OF BUFFALO, NEW YORK

WINDSHIELD CLEANER AND WIPER CARRYING ARM THEREFOR

Application filed February 7, 1929. Serial No. 338,289.

This invention relates to a wiper arm for windshield cleaners, and particularly to that type wherein the arm is readily detachable from the motor or operating shaft and is held attached by a dual functioning spring device, which mode of attachment does away with the necessity or requirement of bolts, screws and nuts, and even the application of tools during the mounting or demounting of the wiper carrying arm. This particular type of arm is shown in Patent No. 1,674,657 granted to John R. Oishei on June 26, 1928.

In the past, the wiper blades have been attached to the wiper carrying arm by means of screws which would become rusted and because of this fact would make it difficult to replace the wiper blade when it had become worn to a useless state. The recent trend in the windshield cleaner art has been to connect the wiper blade to the wiper carrying arm through the instrumentality of a toolless connection whereby the mounting and demounting of the wiper blade on the arm has not only been greatly facilitated but also rendered more expeditious. Such a mounting I have shown in my copending application filed July 29, 1927 under Serial No. 209,262 wherein a clip part is provided on the blade to be interlocked with the free end of the wiper carrying arm for which purpose said free end has an outward deflection.

The present invention has for its objects to provide a wiper carrying arm constructed for embodiment in the arm attachment as well as the wiper mounting of the above referred to patent and application; to provide a wiper carrying arm which is reversible in its make-up, having either end interchangeably and selectively engageable with the operating shaft and with the wiper blade; and to provide a wiper carrying arm with resilient means shiftably mounted thereon to an operative position adjacent either end of the arm, whichever end is attached to the operating shaft.

Referring more in detail to the accompanying drawings wherein is disclosed the preferred embodiment of my invention, Fig. 1 is a fragmentary showing illustrating the shaft-attached end of the improved wiper carrying arm about to be attached, the dotted showing indicating the arm attached or coupled to the shaft.

Fig. 2 is a side elevation of a windshield cleaner mounted upon a section of a windshield and depicting the wiper blade in process of being mounted on the lower or free end of the wiper carrying arm, the dotted showing indicating the wiper blade attached and contacting with the windshield glass.

Fig. 3 is a detailed perspective showing of the wiper carrying arm per se.

Fig. 4 is an elevation illustrating the spring permanently associated with the spring arm, and indicating in the solid line and dotted line showings the shiftability of said spring for association with either end of the arm.

Referring more in detail to the accompanying drawings, the numeral 1 designates the wiper carrying arm which is preferably formed from a length of stout wire and has one end obtusely deflected to form a bend 2 in the wire body and an angular portion 3, the free end of which latter is bent at a slightly acute angle to form a combined pintle and hook part 4. The opposite end portion of the body 1 is also obtusely deflected to form a bend 5 and a corresponding angular portion 6 which terminates in an acutely deflected combined pintle and hook part 7. The obtuse deflection of the portion 6 is in a plane at right angles to the plane of deflection of the portion 3, and the combined pintle and hook 4 extends at right angles to the combined pintle and hook 7 and preferably in parallel planes, both parts 4 and 7 extending transversely across, or substantially across, the longitudinal axis of the body 1. This right angular relation of the parts 4 and 7 is preferable because of the fact that in the connection of the wiper arm with the operating shaft 8 of the windshield cleaner motor 9 either one of the combined pintle and hook parts 4 and 7 pivotally engages in a transverse journal bearing in said shaft, as indicated at 10, which permits the lower or free end of the arm to swing toward and from the windshield glass in a plane perpendicular thereto, while the part 7, (4) at the lower or the free end of the arm extends outwardly away from the glass in order to effect the desired blade mounting. As set forth in my referred to application, the wiper blade 11 is provided with a substantially U-shaped clip 12 secured over the back of the blade in inverted relation, with the back of the clip provided with an opening 13 into which is hooked the adjacent combined pintle and hook part 7, (4) of the wiper arm in a manner similar to that shown in the solid lines in Fig. 2, and after this hooked relation has been effected the arm and blade are released so that the pressure exerted by the spring device, now to be referred to, will force the blade against the glass and cause the elbow 7', (4') to bear against the back of the blade 11, as is most clearly shown by the dotted lines in Fig. 2.

The spring device embodies a spring 14 and a stirrup 15, the latter being suspended from the motor shaft 8 and engaged about the spring arm beneath the spring 14 so as to hold the latter normally under tension. The spring 14, preferably coiled about the arm 1, is disposed to slide or shift along the wiper arm for location at either end portion thereof. Thus, the spring may be arranged adjacent the shaft-attached end of the reversible arm. By reason of the obtuse deflections 3 and 6 of the end portions of the arm, the spring is accorded a like deflection or kink to afford a slight binding of the spring on the wiper arm sufficient to hold the spring at either end to which it is moved, as during the interval when the stirrup 15 is being operatively positioned. As noted in the aforesaid patent, the stirrup is provided with a substantially key-shaped slot 16 by which it may be passed over either end of the arm as well as over the spring.

By having the opposite ends of the wiper arm interchangeably and selectively engageable with the shaft, it will be impossible to effect any improper engagement of the arm with the shaft through attachment of a wrong end; and after the arm has been operatively connected to the shaft, as by pulling downwardly upon the arm to compress the spring on its supporting stirrup and then introducing the adjacent combined pintle and hook part into the bearing 10 of said shaft, the blade 11 is next interlocked with the free end of the arm, the adjacent and obtusely deflected portion 6, (3) lying between the side flanges of the clip so as to resist lateral swinging of the blade about an axis perpendicular to the windshield glass.

What is claimed is:

1. A windshield wiper carrying arm assembly comprising an arm body formed from a length of wire and having its opposite ends obtusely deflected in planes at right angles to each other, and the outer ends of said obtusely deflected portions bent at an acute angle to form combined pintle and hook parts extending at right angles to each other across the longitudinal axis of the body and in substantially parallel planes, and a coiled spring shiftably mounted on the body and held against unauthorized displacement by said parts, said spring being shiftable to either end of the body for association with a mounting stirrup when pivoting a selected one of said parts in an operating shaft.

2. A wiper carrying arm for windshield cleaners having an operating shaft and a wiper blade, each with a bearing to receive parts of the arm, comprising an arm body formed from a length of wire and having its opposite ends obtusely deflected in planes at right angles to each other, and the outer ends of said obtusely deflected portions bent at an acute angle to form combined pintle and hook parts extending at right angles to each other in susbtantially parallel planes for interchangeable engagement in the bearings of the shaft and blade.

3. A wiper arm construction comprising an arm body having its opposite terminals laterally deflected in planes substantially at right angles to each other for forming combined pintle and hook parts.

4. A wiper arm for windshield cleaners, comprising an arm body formed from a length of wire and having one end bent at an angle to constitute a pintle for pivoting the arm relative to the actuating shaft of a windshield cleaner, the opposite end of the arm also being bent at an angle to constitute a hook for the ready connection and attachment of a wiper blade to the arm, and a coiled spring engaged with the arm body between the bent opposite ends thereof for use in securing the pintle to an actuating shaft.

5. A wiper arm for windshield cleaners, comprising an elongated arm body having a laterally extending pintle at one end and a laterally extending hook at the opposite end, said pintle and said hook extending in different directions in planes substantially at right angles to each other and constituting at one end a pintle for pivotally engaging in a bearing and at the opposite end a hook for engaging with a wiper blade.

HENRY HUEBER.